Figure 1:
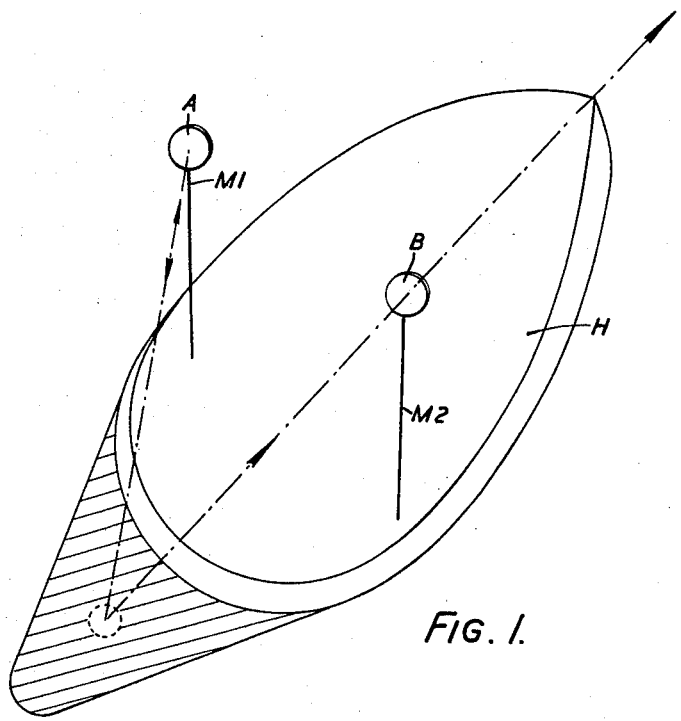

United States Patent Office 3,251,059
Patented May 10, 1966

3,251,059
NAVIGATION AIDING RADAR SYSTEMS
Edward Marshall Wells, Essex, England, assignor to Marconi's Wireless Telegraph Company Limited, London, England, a British company
Filed May 20, 1963, Ser. No. 281,417
Claims priority, application Great Britain, July 2, 1962, 25,245/62
4 Claims. (Cl. 343—8)

This invention relates to navigation aiding radar systems and is primarily intended to solve, with the aid of relatively simple and inexpensive radar equipment, certain difficult problems which arise in connection with the navigation of so-called Hovercraft or cushion craft (hereinafter referred to by the term Hovercraft) when used at sea or in other circumstances in which ordinary visual navigation by observation of charted or mapped objects is not possible.

The difficulties which arise in navigating Hovercraft at sea or in like circumstances occur because such craft, though supported only a few feet above the sea, are air-borne and therefore the course and distance made good is compounded of the course and distance through the air and the wind movement of the air itself. In other words Hovercraft are subject to wind drift and large drift angles of the order of 20° or 30° (or possibly more in strong cross winds) are liable to be present. The use of pitot tubes or similar air speed measuring instruments is obviously unsatisfactory and will not take care of the problem of drift and apart from this purely navigational consideration, an air pitot head is apt to give large errors of reading if the attitude of the craft changes and, of course, there are large turbulence effects near the surface of the sea when waves of any size are present. Instruments measuring speed in relation to the water are objectionable because they require contact with or immersion in the water and therefore introduce substantial drag and must be very robustly built. An ordinary simple speed-measuring continuous wave Doppler radar set with a single transmitting and receiving aerial pointing ahead and downwards on to the sea and measuring speed in terms of the Doppler shift between the transmitted and the received frequencies is not satisfactory because it will measure only the forward component of speed relative to the sea and will not take into account or measure drift as is, of course, necessary navigationally. A navigation aiding Doppler equipment of the kind employed for aircraft navigation and wherein a number of beams (commonly four) are transmitted outwards and downwards (for example down and ahead to port and starboard and down and astern to port and starboard) is not satisfactory for Hovercraft use in part because of the cost and complexity of such equipment, and in part because of the small height of a Hovercraft over the sea and the consequent difficulty and uncertainty in obtaining satisfactory and Doppler-error free reflections from the different reflecting areas under all practical conditions, including calm.

According to this invention a radar system suitable for use on a Hovercraft comprises two directional aerials, means for mounting said aerials so as to be directed with downward inclination towards a common area of reflecting surface, means for transmitting continuous radio waves from one aerial and receiving on said aerial waves reflected from said area, means for receiving on the other aerial waves reflected from said area, means for deriving signals representative of the Doppler difference between the frequency transmitted from the first-mentioned aerial and the reflected frequency received thereby, means for deriving signals representative of the Doppler difference between the frequency transmitted from said first mentioned aerial and the reflected frequency received by the other aerial, and means for utilising the two Doppler-frequency-representative signals to ascertain forward speed and drift or a compounded resultant of said speed and drift.

Preferably the aerials are so mounted that their directions are equally inclined downwards and equally inclined with reference to the fore-and-aft line of the craft and so as to be directed towards a common reflecting surface area below and immediately astern of the craft. When a Hovercraft is travelling over water it leaves behind it a parallel sided area of brushed water somewhat analagous to the wake of a ship, extending aft at an angle the relation of which to the fore-an-aft line of the craft depends on the drift of the craft. This brushed water surface is a reflecting radar surface of good and reasonably constant characteristics and even in a general glassy calm it will reflect radio waves well. Knowing the maximum drift angle to be expected it is possible to draw an isosceles triangularly shaped area with its apex aft through which the brushed water "wake" will pass irrespective of the direction of drift. If the drift angle is 30° this isosceles triangle is equilateral. By directing the aerials towards this triangular area it is ensured that they will always be directed on a good reflecting surface since for all drift angles (up to the maximum estimated and allowed for) and all directions of drift, the "wake" will pass through the area.

Preferably also the two aerials are so mounted that their directions are inclined downwards at substantially 45° to the horizontal and inclined at substantially 45° to the fore-and-aft line of the craft when it is in its correct travelling attitude, said aerials being spaced apart by substantially $\sqrt{2}$ times their common height above the plane of the reflecting surface when the craft is at its correct travelling height.

A preferred embodiment comprises a continuous wave transmitter, a transmitting and receiving aerial fed thereby, a mixer-detector for deriving the Doppler difference between the transmitted and received frequencies at this aerial, a receiving aerial, a mixer fed from this aerial and from the transmitter and adapted to derive the Doppler difference between the transmitter frequency and the received frequency at the last mentioned aerial, and means fed with the two Doppler frequencies for deriving therefrom signals representative of the forward speed of the craft and the drift thereof or the compounded resultant of forward speed and drift.

Figure 2:
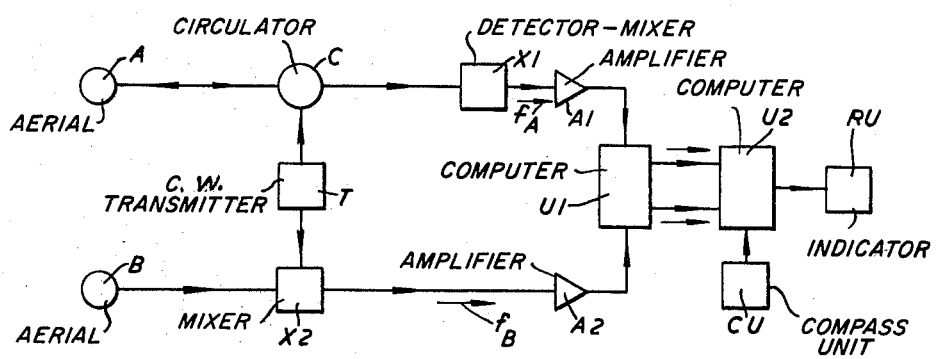

The invention is illustrated in the simplified schematic and diagrammatic accompanying drawings in which FIGURE 1 illustrates the aerial installation and FIGURE 2 is a block diagram of the circuitry.

Referring to FIGURE 1, H represents a Hovercraft near the after end of which are two directional aerials which, when the craft is at its correct travelling height above the sea and in its correct travelling attitude, are at a predetermined height $h$ above the general sea surface plane and are directed downwards at an angle of 45° to that plane and are also directed inwardly and astern at an angle of 45° to the fore-and-aft line (represented by the arrow headed broken line) of the craft. For simplicity of showing, the aerials are represented as carried on vertical masts M1, M2, but in practice the aerials would be recessed into or mounted directly on the Hovercraft structure. In this way adequate clearance above the water is obtainable. The aerials are in an athwart-ship line and spread apart by a distance of $h\sqrt{2}$. They are directed towards a small common reflecting sea area (represented by the broken line circle) closely astern of the craft. When the craft is travelling the parallel side, brushed water "wake" behind it will, for all directions and magnitudes of drift up to an estimated maximum, pass through the triangular area which is shaded in FIGURE 1.

Referring to FIG. 2, T is a CW transmitter of frequency $f_0$ whose output is fed via a suitable circulator or other known means C to the aerial A for transmission. The received reflected signals at A are passed via the circulator C to a detector-mixer X1 of known type whose output will be the Doppler frequency difference $f_A$ between the waves transmitted and received by aerial A. Aerial B only receives reflected waves and these are mixed in a mixer X2 with the frequency $f_0$ from the transmitter to produce the Doppler frequency difference $f_B$ between $f_0$ and the waves received by aerial B.

It may be shown that if $v$ is the forward velocity of the craft in the fore-and-aft line; $d$ is the drift angle (i.e., the angle between the direction in which the craft is headed and the direction in which it is actually moving due to forward speed and drift together); D is the depression angle of the aerials (i.e., their angle downward to the horizontal namely 45° in this case); and $c$ is the radio propagation speed.

$$f_A = \frac{2v}{c} f_0 \cos D \cos (45+d) \tag{1}$$

and $$f_B = \frac{v}{c} f_0 \cos D [\cos (45+d) + \cos (45-d)] \tag{2}$$

if one assumes aerial A to be on the port side, aerial B to be on the starboard side and takes drift to starboard as giving a positive drift angle and drift to port as giving a negative drift angle.

These two equations clearly give all the information necessary to ascertain $v$ and $d$ and may be simplified to $$\tan d = 1 - \frac{f_A}{f_B} \tag{3}$$

and $$v = \frac{f_B c}{\sqrt{2} f_0 \cos D \cos d} \tag{4}$$

or (approximately) if $d$ is between 0° and 20°

$$d = 55 \cdot 5 \left(1 - \frac{f_A}{f_B}\right) \text{ degrees} \tag{5}$$

and $$v = K f_B \left(1 + \frac{d^2}{6500}\right) \tag{6}$$

where $$K = \frac{C}{\sqrt{2} f_0 \cos D} \tag{7}$$

and $c$ is in the same units as $v$.

It is, therefore, a simple matter requiring no invention by those skilled in the art, to design a computer unit which, when fed with $f_A$ and $f_B$ will produce outputs of $v$ and $d$. Block U1 in FIG. 2 represents such a computer unit fed with $f_A$ and $f_B$ via amplifiers A1 and A2. The $v$ and $d$ outputs from unit U1 are shown as fed to a second computer unit U2 which receives a steering compass input from a compass unit CU and produces in known manner from these three inputs an output representative of course and speed made good (i.e., including drift) or direction and distance made good. This output is fed to an indicator and/or recorder unit RU operating on well known principles, and which may be arranged to indicate or record course and speed made good and/or direction and distance made good or may be arranged continuously to work up the position from the information fed to it.

I claim:

1. A radar system suitable for use on a Hovercraft, said system comprising two directional aerials, means for mounting said aerials so as to be directed with downward inclination towards a common area of reflecting surface, means for transmitting continuous radio waves from one aerial and receiving on said aerial waves reflected from said area, means for receiving on the other aerial waves reflected from said area, means for deriving signals representative of the Doppler difference between the frequency transmitted from the first-mentioned aerial and the reflected frequency received thereby, means for deriving signals representative of the Doppler difference between the frequency transmitted from said first mentioned aerial and the reflected frequency received by the other aerial, and means for utilising the two doppler-frequency-representative signals to ascertain forward speed and drift or a compounded resultant of said speed and drift.

2. A radar system as claimed in claim 1 wherein the aerials are so mounted that their directions are equally inclined downwards and equally inclined with reference to the fore-and-aft line of the craft and so as to be directed towards a common reflecting surface area below and immediately astern of the craft.

3. A radar system as claimed in claim 1 wherein the two aerials are so mounted that their directions are inclined downwards at substantially 45° to the horizontal and inclined at substantially 45° to the fore-and-aft line of the craft when it is in its correct travelling attitude, said aerials being spaced apart by substantially $\sqrt{2}$ times their common height above the plane of the reflecting surface when the craft is at its correct travelling height.

4. A radar system suitable for use on a hovercraft, said system comprising a continuous wave transmitter; a directional transmitting and receiving aerial fed by said transmitter; a directional receiving aerial; means for mounting said aerials so as to be directed with a downward inclination towards a common area of reflecting surface; means, including a mixer-detector, for deriving signals representative of the Doppler difference between the transmitted and received frequencies at the transmitting and receiving aerial; means including a mixer fed from the receiving aerial and from said transmitter, for deriving signals representative of the Doppler difference between the transmitted frequency and the frequency received at the receiving aerial; and means fed with the two Doppler signals for deriving therefrom signals representative of the forward speed of the hovercraft and the drift thereof or the compounded resultant of forward speed and drift.

No references cited.

LEWIS H. MYERS, *Primary Examiner.*

CHESTER L. JUSTUS, *Examiner.*

R. D. BENNETT, *Assistant Examiner.*